(12) United States Patent
Li et al.

(10) Patent No.: US 12,451,528 B2
(45) Date of Patent: Oct. 21, 2025

(54) IN-SITU ELECTROLYTE PREPARATION IN FLOW BATTERY

(71) Applicant: Raytheon Technologies Corporation, Waltham, MA (US)

(72) Inventors: Weina Li, South Glastonbury, CT (US); Michael L. Perry, Glastonbury, CT (US)

(73) Assignee: RTX CORPORATION, Arlington, VA (US)

( * ) Notice: Subject to any disclaimer, the term of this patent is extended or adjusted under 35 U.S.C. 154(b) by 360 days.

(21) Appl. No.: 17/171,272

(22) Filed: Feb. 9, 2021

(65) Prior Publication Data

US 2021/0167433 A1 Jun. 3, 2021

Related U.S. Application Data

(63) Continuation of application No. 14/892,586, filed as application No. PCT/US2013/042174 on May 22, 2013, now abandoned.

(51) Int. Cl.
*H01M 10/44* (2006.01)
*H01M 8/18* (2006.01)
(Continued)

(52) U.S. Cl.
CPC ......... *H01M 10/446* (2013.01); *H01M 8/188* (2013.01); *H01M 8/20* (2013.01);
(Continued)

(58) Field of Classification Search
None
See application file for complete search history.

(56) References Cited

U.S. PATENT DOCUMENTS

| 5,318,865 A | 6/1994 | Kaneko et al. |
| 5,648,184 A | 7/1997 | Inoue et al. |

(Continued)

FOREIGN PATENT DOCUMENTS

| JP | S54-19228 | 7/1979 |
| JP | H02-148659 | 6/1990 |

(Continued)

OTHER PUBLICATIONS

File History for U.S. Appl. No. 13/513,651 now U.S. Pat. No. 9,166,243 issued Oct. 20, 2015.
(Continued)

*Primary Examiner* — Carlos Barcena
(74) *Attorney, Agent, or Firm* — Carlson, Gaskey & Olds, P.C.

(57) ABSTRACT

A method of in-situ electrolyte preparation in a flow battery includes providing a vanadium-based electrolyte solution having vanadium ions of predominantly vanadium $V^{4+}$ to a first electrode and a second electrode of at least one cell of a flow battery. The vanadium $V^{4+}$ at the first electrode is converted to vanadium $V^{3+}$ and the vanadium $V^{4+}$ at the second electrode is converted to vanadium $V^{5+}$ by providing electrical energy to the electrodes. A reducing agent is then provided to the vanadium $V^{5+}$ at the second electrode to reduce the $V^{5+}$ to vanadium $V^{4+}$. The vanadium $V^{3+}$ at the first electrode is then converted to vanadium $V^{2+}$ and the vanadium $V^{4+}$ at the second electrode is then converted to vanadium $V^{5+}$ by providing electrical energy to the electrodes. A simple method to produce predominantly vanadium $V^{4+}$ electrolyte from a $V^{5+}$ source, such as $V_2O_5$, is also taught.

9 Claims, 2 Drawing Sheets

(51) Int. Cl.
H01M 8/20 (2006.01)
H01M 10/0563 (2010.01)
H02J 7/00 (2006.01)

(52) U.S. Cl.
CPC ........... *H01M 10/0563* (2013.01); *H02J 7/00* (2013.01); *H01M 2300/002* (2013.01); *Y02E 60/50* (2013.01)

(56) References Cited

U.S. PATENT DOCUMENTS

| | | |
|---|---|---|
| 9,166,243 B2 | 10/2015 | Perry |
| 2006/0183016 A1 | 8/2006 | Kazacos |
| 2008/0274393 A1 | 11/2008 | Markoski et al. |
| 2008/0292938 A1 | 11/2008 | Perry et al. |
| 2009/0136789 A1 | 5/2009 | Pien et al. |
| 2013/0084482 A1 | 4/2013 | Chang |
| 2013/0095362 A1 | 4/2013 | Keshavarz |

FOREIGN PATENT DOCUMENTS

| | | |
|---|---|---|
| JP | 2006-156029 | 6/2006 |
| WO | 1989005528 | 12/1988 |
| WO | 1989005363 | 6/1989 |
| WO | 2013027076 | 2/2013 |
| WO | 2013054921 | 4/2013 |

OTHER PUBLICATIONS

Certified Translation. Japanese Publication of Examined Patent Application No. S54-102887 published Jul. 13, 1979.
Certified Translation. Japanese Unexamined Patent Application No. H2-148659 published Jun. 7, 1990.
Certified Translation. Japanese Unexamined Patent Application No. 2006-156029 published Jun. 15, 1990.
Linden, D. and Reddy, T.B. Eds. (2002). Handbook of batteries. New York, NY: McGraw-Hill. pp. 37.12, 18-23, 42.3-42.13, 43.11-43.3, Appendix A.
Laramini, J. and Dicks, A. (2003). Fuel cell systems explained. Chichester, England: John Wiley & Sons Inc. pp. xv, xvi, 18-19, 88-89, 94-96.
Haar, D. (2016). Dan Haar: United Technologies battery could upend the power business. Hartford Courant. Retrieved Feb. 22, 2017 from: http://www.courant.com/business/dan-haar/hc-haar-united-technologies-battery-for-electric-grid-20160523-column.html.
Aricò, A.S., Creti, P., Baglio, V., Modica, E., and Antonucci, V. (2000). Influence of flow field design on the performance of a direct methanol fuel cell. Journal of Power Sources vol. 91. 2000. pp. 202-209.
Li, X. and Sabir, I. (2004). Review of bipolar plates in PEM fuel cells: Flow-field designs. International Journal of Hydrogen Energy vol. 30. 2005. pp. 359-371.
Negishi, A. (2003). Redox flow battery. (Certified Translation). Fuel Cells vol. 2(4). 2003. pp. 69-74.

Yi, J.S., and Nguyen T.V. (1996). Abstract: Hydrodynamics of reactant gas in the electrode of PEM fuel cells with inter-digitated flow fields. The Electrochemical Society, Inc. Meeting Abstracts. Fall Meeting, San Antonio, TX. Oct. 6-11, 1996. p. 974-976.
Kazim, A., Liu, H.T., and Forges, P. (1999). Modelling of performance of PEM fuel cells with conventional and interdigitated flow fields. Journal of Applied Electrochemistry vol. 29(12). 1999. pp. 1409-1416.
Wang, L. and Liu, H. (2004). Performance studies of PEM fuel cells with interdigitated flow fields. Journal of Power Sources vol. 134(2). 2004. pp. 185-196.
Guo, S.M. (2005). The simulation of a PEMFC with an interdigitated flow field design. Computational Science 5th International Conference. May 2005. pp. 104-111.
He, W., Yi, J.S., Nguyen, T.V. (2000). Two-phase flow model of the cathode of PEM fuel ceels using interdigitated flow fields. AIChE Journal vol. 46(10). Oct. 2000. pp. 2053-2064.
Nozaki, K., Hamamoto, O., Kaneko, H., and Ozawa, T. (1975). (Certified Translation). Prospect of power storage using redox flow type secondary battery. Electrochemical/Electro-thermal Study Group Material. The Institute of Electrical Engineers of Japan. Nov. 28, 1975. pp. 1-16.
Declaration of Dr. Toru Kato, Ph.D. In re U.S. Pat. No. 9,166,243. Executed Feb. 23, 2017. pp. 1-89.
Prior Art Claim Chart for U.S. Pat. No. 9,166,243, Oct. 20, 2015.
Ponce de León, C., Frías-Ferrer, A., González-García, Szánto, D.A., and Walsh, F.C. (2006). Redox flow cells for energy conversion. Journal of Power Sources vol. 160. 2006. pp. 716-732.
Negishi, A. (2003). Redox flow battery. Fuel Cells vol. 2(4). 2003. pp. 69-74.
Nozaki, K., Hamamoto, O., Kaneko, H., and Ozawa, T. (1975). Prospect of power storage using redox flow type secondary battery. Electrochemical/Electro-thermal Study Group Material. The Institute of Electrical Engineers of Japan. Nov. 28, 1975. pp. 1-16.
Shigematsu, T. (2011). Redox flow battery for energy storage. SEI Technical Review No. 73. Oct. 2011. pp. 4-13.
Tokuda, N., Kanno, T., Hara, T., Shigematsu, T., Tsutsui, Y., Ikeuchi, A., Itou, T., et al. (2000). Development of a redox flow battery system. SEI Technical Review No. 73. Jun. 2000. pp. 88-94.
Hagedorn, N.H. (1984). NASA redox storage system development project. Final Report. DOE/NASA/12726-24. Oct. 1984. pp. 1-43.
Sumitomo Electric. Redox Flow Battery. Technical Document. Retrieved May 8, 2017 from: http://global-sei.com/products/redox/pdf/redox-flow-battery.pdf.
Petition for Inter Partes Review of U.S. Pat. No. 9,166,243. *Sumitomo Electric Industries, Ltd.,* Petitioner, v. *United Technologies Corporation,* Patent Owner. Filed Feb. 23, 2017.
International Preliminary Report of Patentability for PCT Application No. PCT/US2013/042174 mailed May 28, 2015.
M. Bobtelsky. The Rate of Reduction of Vanadium Pentoxide in Concentrated Acid Solutions. Reduction of Vanadium Pentoxide by Arsenious Acid, Oxalic Acid, Formaldehyde and Ethyl Alcohol. Journal of the American Chemical Society (1942), 64, pp. 1462-1469.
International Search Report for PCT Application No. PCT/US2013/042174 mailed Oct. 21, 2013.

IN-SITU ELECTROLYTE PREPARATION IN FLOW BATTERY

REFERENCE TO RELATED APPLICATIONS

This application is a Continuation of U.S. patent application Ser. No. 14/892,586 filed Nov. 20, 2015; which is a National Phase of International Patent Application No. PCT/US2013/042174 filed May 22, 2013.

BACKGROUND

Flow batteries, also known as redox flow batteries or redox flow cells, are designed to convert electrical energy into chemical energy that can be stored and later released when there is demand. As an example, a flow battery may be used with a renewable energy system, such as a wind-powered system, to store energy that exceeds consumer demand and later release that energy when there is greater demand.

A typical flow battery includes a redox flow cell that has a negative electrode and a positive electrode separated by an electrolyte layer, which may include a separator, such as an ion-exchange membrane. A negative fluid electrolyte (sometimes referred to as the anolyte) is delivered to the negative electrode and a positive fluid electrolyte (sometimes referred to as the catholyte) is delivered to the positive electrode to drive electrochemically reversible redox reactions. Upon charging, the electrical energy supplied causes a chemical reduction reaction in one electrolyte and an oxidation reaction in the other electrolyte. The separator prevents the electrolytes from freely and rapidly mixing but permits selected ions to pass through to complete the redox reactions. Upon discharge, the chemical energy contained in the liquid electrolytes is released in the reverse reactions and electrical energy can be drawn from the electrodes. Flow batteries are distinguished from other electrochemical devices by, inter alia, the use of externally-supplied, fluid electrolyte solutions that include reactants that participate in reversible electrochemical reactions.

SUMMARY

Disclosed is a method of in-situ electrolyte preparation in a flow battery includes providing a vanadium-based electrolyte solution having vanadium ions of predominantly vanadium $V^{4+}$ to a first electrode and a second electrode of at least one cell of a flow battery. The vanadium $V^{4+}$ at the first electrode is converted to vanadium $V^{3+}$ and the vanadium $V^{4+}$ at the second electrode is converted to vanadium $V^{5+}$ by providing electrical energy to the electrodes. A reducing agent is then provided to the vanadium $V^{5+}$ at the second electrode to reduce the $V^{5+}$ to vanadium $V^{4+}$. The vanadium $V^{3+}$ at the first electrode is then converted to vanadium $V^{2+}$ and the vanadium $V^{4+}$ at the second electrode is then converted to vanadium $V^{5+}$ by providing electrical energy to the electrodes.

Also disclosed is a method of preparing a vanadium-based electrolyte solution having vanadium ions of predominantly $V^{4+}$. The method includes providing a first solution and a second solution. At least one of the solution and the second solution includes vanadium $V^{5+}$. At least one of the first solution and the second solution includes a reducing agent, and a ratio of moles of the reducing agent to moles of the vanadium $V^{5+}$ is 2:1 or greater. The first solution and the second solution are then combined. The reducing agent reduces the $V^{5+}$ to $V^{4+}$.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
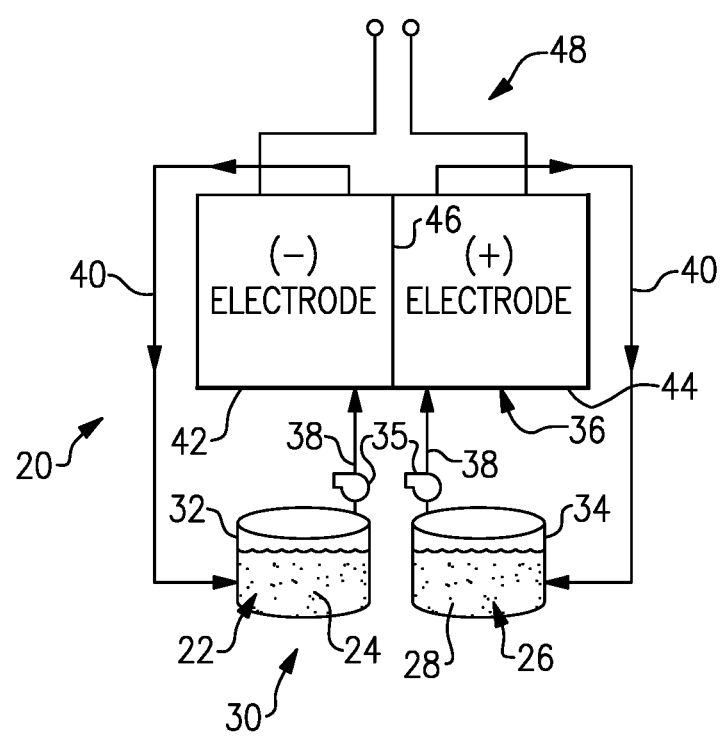
FIG. 1 illustrates an example flow battery.

FIG. 1 schematically shows portions of an example flow battery 20 that can be used for selectively storing and discharging electrical energy. As an example, the flow battery 20 can be used to convert electrical energy generated in a renewable energy system to chemical energy that is stored until a later time when there is greater demand, at which time the flow battery 20 then converts the chemical energy back into electrical energy. The flow battery 20 can supply the electric energy to an electric grid, for example.

The flow battery 20 includes a fluid electrolyte 22 that has an electrochemically active specie 24 which, under charge and discharge conditions, functions in a redox pair with regard to an additional fluid electrolyte 26 that has an electrochemically active specie 28. In this example, the electrochemically active species 24/28 are based on vanadium and the fluid electrolytes 22/26 are thus vanadium-based electrolyte solutions. The fluid electrolytes 22/26 are contained in a supply/storage system 30 that includes first and second vessels 32/34 and pumps 35.

The fluid electrolytes 22/26 are delivered from the first and second vessels 32/34, using the pumps 35, to at least one cell 36 of the flow battery 20 through respective feed lines 38. The fluid electrolytes 22/26 are returned from the cell 36 to the vessels 32/34 via return lines 40. The feed lines 38 and the return lines 40 connect the vessels 32/34 with first and second electrodes 42/44 of the cell. Multiple cells 36 can be provided as a stack.

The cell or cells 36 each include the first electrode 42, the second electrode 44 spaced apart from the first electrode 42, and an electrolyte separator layer 46 arranged between the first electrode 42 and the second electrode 44. For example, the electrodes 42/44 are porous carbon structures, such as carbon paper or felt. In general, the cell or cells 36 can include bipolar plates, manifolds and the like for delivering the fluid electrolytes 22/26 through flow field channels to the electrodes 42/44. The bipolar plates can be carbon plates, for example. It is to be understood, however, that other configurations can be used. For example, the cell or cells 36 can alternatively be configured for flow-through operation where the fluid electrolytes 22/26 are pumped directly into the electrodes 42/44 without the use of flow field channels.

The electrolyte separator layer 46 can be an ionic-exchange membrane, an inert micro-porous polymer membrane or an electrically insulating microporous matrix of a material, such as silicon carbide (SiC), that prevents the fluid electrolytes 22/26 from freely and rapidly mixing but permits selected ions to pass through to complete the redox reactions while electrically isolating the electrodes 42/44. In this regard, the fluid electrolytes 22/26 are generally isolated from each other during normal operation of the flow battery, such as in charge, discharge and shutdown states.

The fluid electrolytes 22/26 are delivered to the cell 36 to either convert electrical energy into chemical energy or, in the reverse reaction, convert chemical energy into electrical energy that can be discharged. The electrical energy is transmitted to and from the cell 36 through an electric circuit 48 that is electrically coupled with the electrodes 42/44.

In the charge, discharge and shutdown state after charge or discharge, the vanadium in the first fluid electrolyte 22 has vanadium ions of $V^{2+}/V^{3+}$ and the vanadium in the second fluid electrolyte 26 has vanadium ions of $V^{4+}/V^{5+}$ (which can also be denoted as V(ii)/V(iii) and V(iv)/V(v), although the valences of the vanadium species with oxidation states of 4 and 5 are not necessarily 4+ and 5+), the concentrations of which depend upon the charge state of the flow battery 20. In the illustrated example, however, the flow battery 20 is shown in an in-situ preparation state, prior to any charging or discharging of the fluid electrolytes 22/26, for preparing the fluid electrolytes 22/26 from starting materials. In the in-situ preparation state, the fluid electrolytes 22/26 each have vanadium ions of predominantly $V^{4+}$. The term "predominantly" and variations thereof used herein with reference to ions of a particular oxidation state means that the particular oxidation state is the highest concentration oxidation state among all oxidation states of the electrochemically active species. In further examples, equivalent amounts (by volume) or substantially equivalent amounts of the fluid electrolytes 22/26 are provided to the electrodes 42/44 such that there are also equivalent or substantially equivalent concentrations of $V^{4+}$ at the electrodes 42/44. For example, the fluid electrolytes 22/26 are provided from the same source batch or starting material such that, once the starting material is divided, the fluid electrolytes 22/26 have equivalent or substantially equivalent concentrations of $V^{4+}$. The fluid electrolytes 22/26 thus also have equivalent or substantially equivalent amounts (by moles) of $V^{4+}$. The term "substantially equivalent" used herein with reference to amounts or concentrations means that the amounts or concentrations are within +/−5%.

The preparation of vanadium-based fluid electrolytes for flow batteries can be relatively expensive. For example, vanadium-based fluid electrolyte can be produced, ex-situ with respect to a flow battery, from vanadyl sulfate ($VOSO_4$) crystals. Vanadyl sulfate is expensive and thus greatly increases the cost of preparing a vanadium-based fluid electrolyte. As will be described, the flow battery 20 can be used for the in-situ preparation of the fluid electrolytes 22/26 from relatively inexpensive vanadium oxide ($V_2O_5$) powder.

Figure 2:
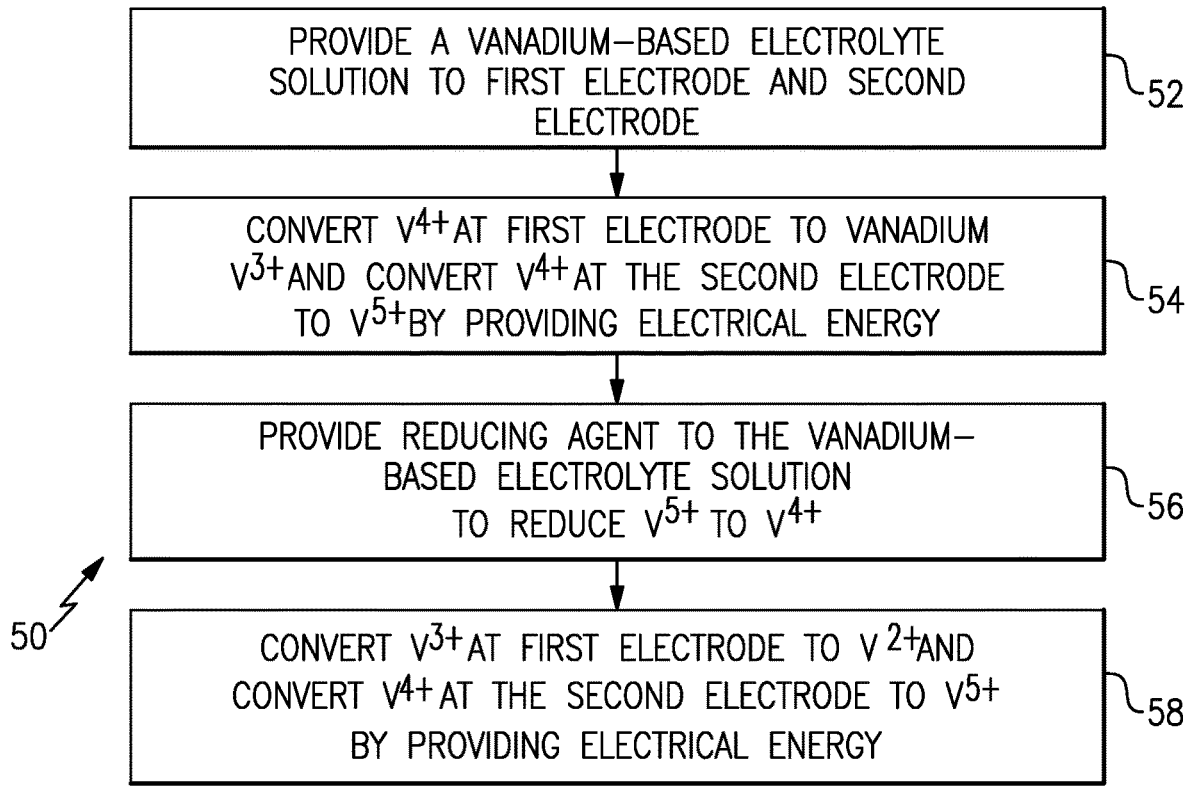
FIG. 2 illustrates an example method of in-situ electrolyte preparation in a flow battery.

FIG. 2 illustrates an example method 50 of in-situ electrolyte preparation in a flow battery, such as the flow battery 20. As shown, the method 50 generally includes steps 52, 54, 56 and 58. The example method 50 will be described with reference to the flow battery 20. However, it is to be understood that the method 50 is not limited to the illustrated configuration of the flow battery 20 disclosed herein and may be utilized with other flow batteries having different configurations. In this example, step 52 includes providing a vanadium-based electrolyte solution having vanadium ions of predominantly vanadium $V^{4+}$ to the first electrode 42 and the second electrode 44. With reference to FIG. 1, the vanadium-based electrolyte solution can be provided in the vessels 32/34 and then pumped into the cell 36 to the respective first and second electrodes 42/44. In one example, the vanadium ions provided to each of the first electrode 42 and the second electrode 44 has a concentration of 90% or greater, or alternatively 95% or greater, of $V^{4+}$.

After providing the vanadium-based electrolyte solution to the first and second electrodes 42/44, the vanadium $V^{4+}$ at the first electrode 42 and the second electrode 44 are converted, respectively, to vanadium $V^{3+}$ and vanadium $V^{5+}$ by providing electrical energy through the electric circuit 48 to the first and second electrodes 42/44.

The electrical energy is then stopped and, at step 56, a reducing agent is provided into the second fluid electrolyte 26 to reduce the vanadium $V^{5+}$ to vanadium $V^{4+}$. In other words, the charging cycle of the flow battery 20 at step 52 converts the $V^{4+}$ to, respectively, $V^{3+}$ and $V^{5+}$, while the reducing agent then converts the $V^{5+}$ back to $V^{4+}$. At this stage in the method 50, the vanadium-based electrolyte solution at the first fluid electrolyte 22 is thus predominantly $V^{3+}$ and the vanadium-based second electrolyte solution at fluid electrolyte 26 is predominantly $V^{4+}$.

At step 58, which represents a second charging cycle, electrical energy is again provided through the electric circuit 48 to the first and second electrodes 42/44 to convert the $V^{3+}$ at the first electrode 42 to $V^{2+}$ and convert the $V^{4+}$ at the second electrode 44 to $V^{5+}$. Thus, after step 58, the vanadium-based electrolyte solution at the first electrode 42 and the second electrode 44 are in a fully charged state. Moreover, because equal parts of the vanadium-based electrolyte solution are provided to the first and second electrodes 42/44 at step 52, the concentration of the $V^{2+}$ at the first electrode 42 is equal to the concentration of the $V^{5+}$ at the second electrode 44 after step 58. For example, the concentrations are equal within +/−5%.

In one example, the reducing agent that is added at step 56 includes an acid. In a further example, the acid is selected from oxalic acid, formic acid or combinations thereof. Alcohol can alternatively be used. In one example based upon the use of oxalic acid, a byproduct of the reaction between the electrolyte and the oxalic acid is the generation of carbon dioxide, which is not harmful to the flow battery 20. Thus, the use of oxalic acid additionally provides the benefit of avoiding the generation of toxic chemicals or chemicals that would otherwise debit the performance of the flow battery 20.

Figure 3:
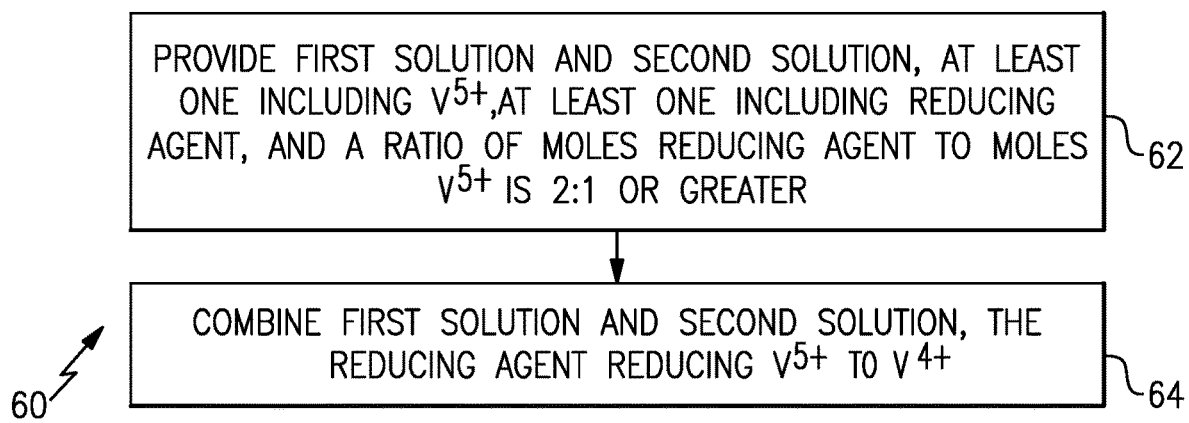
FIG. 3 illustrates an example method of preparing a vanadium-based electrolyte solution having vanadium ions of predominantly $V^{4+}$.

FIG. 3 illustrates an example method 60 of preparing the vanadium-based electrolyte solution having vanadium ions of predominantly $V^{4+}$. As an example, the method 60 can be used to prepare the vanadium-based electrolyte solution that is used in the method 50. The method 60 includes steps 62 and 64. At step 62, a first solution and a second solution are provided. At least one of the first solution and the second solution includes vanadium $V^{5+}$. In one example, the vanadium $V^{5+}$ is the predominant vanadium ion. At least one of the first solution and the second solution includes a reducing agent, and a ratio of moles of the reducing agent to moles of the vanadium $V^{5+}$ is 2:1 or greater.

At step 64, the first solution and the second solution are combined. Once combined, the reducing agent reduces the vanadium $V^{5+}$ to vanadium $V^{4+}$ and thus results in the production of the vanadium-based electrolyte solution with vanadium ions of predominantly $V^{4+}$.

In a further example, the first solution includes the reducing agent and the second solution includes an acid. In a further example, the reducing agent includes oxalic acid, formic acid or a combination thereof, and the acid of the second solution includes sulfuric acid. The oxalic acid can be provided as oxalic acid dihydrate, for example. Alternatively, or in addition to the oxalic acid and formic acid, the reducing agent can include an alcohol. In one further example, the first solution includes the reducing agent and the vanadium $V^{5+}$.

The one of the first solution or the second solution that includes the vanadium $V^{5+}$ can be prepared using vanadium oxide ($V_2O_5$) powder. For example, the vanadium oxide powder can be combined with the reducing agent and water (e.g., deionized water) to form the first solution or can be combined with the acid of the second solution.

Equations I and II below illustrate the underlying chemical reactions of the reduction of the vanadium oxide powder to produce vanadium $V^{4+}$. In Equation I, the reaction product of $VO_2^+$ represents the oxidation state of vanadium $V^{5+}$. In Equation II, the reaction product of $VO^{2+}$ represents the oxidation state of vanadium $V^{4+}$. The reduction of $V^{5+}$ to $V^{4+}$ in Equation II is an endothermic reaction. In method 60, the combining of the first solution and the second solution provides heat to drive this endothermic reaction. For example, the dilution of the acid of the second solution is exothermic and thus provides heat to drive the reduction of $V^{5+}$ to $V^{4+}$. Moreover, the use of the noted ratio of 2:1 provides a sufficient amount of reducing agent to reduce substantially all of the $V^{5+}$ to $V^{4+}$. Thus, the resulting vanadium-based electrolyte solution has predominantly $V^{4+}$. In one further example, step 64 is carried out at room temperature without the application of external heat. The exothermic reaction of the dilution of the acid of the second solution can heat the mixture of the first solution and the second solution to a temperature above room temperature (approximately 23° C.), such as about 60° C. Furthermore, although the method 60 can also be carried out in-situ in the flow battery 20, the method 60 can alternatively be carried out ex-situ, separate from the flow battery 20, with equal amounts of the resulting electrolyte solution having vanadium ions of predominantly $V^{4+}$ subsequently provided into the first and second electrodes 32/44 of flow battery 20 for execution of method 50.

$$V_2O_{5(s)} + 2H^+ \rightarrow 2VO_2^+ + H_2O \qquad \text{EQUATION I:}$$

$$2VO_2^+ + H_2C_2O_4 + 2H^+ \rightarrow 2VO^{2+} + 2CO_2 + 2H_2O \qquad \text{EQUATION II:}$$

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of in-situ electrolyte preparation in a flow battery, the method comprising:
   (a) providing equal parts of a vanadium-based electrolyte solution having vanadium ions of predominantly vanadium $V^{4+}$ to a first electrode and a second electrode of at least one cell of a flow battery, the second electrode being spaced apart from the first electrode, with an electrolyte separator layer arranged between the first electrode and the second electrode;
   (b) while the vanadium-based electrolyte solution is in the at least one cell of the flow battery, converting the vanadium $V^{4+}$ in the vanadium-based electrolyte solution at the first electrode to vanadium $V^{3+}$ and converting the vanadium $V^{4+}$ in the vanadium-based electrolyte solution at the second electrode to vanadium $V^{5+}$ by providing electrical energy through an electric circuit to the first electrode and the second electrode;
   (c) after said step (b), while the vanadium-based electrolyte solution is in the at least one cell of the flow battery, providing a reducing agent to the vanadium-based electrolyte solution of the second electrolyte to reduce the vanadium $V^{5+}$ to vanadium $V^{4+}$; and
   (d) after said step (c), while the vanadium-based electrolyte solution is in the at least one cell of the flow battery, establishing the flow battery to be in a fully charged state by converting the vanadium $V^{3+}$ of said step (b) in the vanadium-based electrolyte solution at the first electrode to vanadium $V^{2+}$ and converting the vanadium $V^{4+}$ of said step (c) in the vanadium-based electrolyte solution at the second electrode to vanadium $V^{5+}$ by providing electrical energy through the electric circuit to the first electrode and the second electrode.

2. The method as recited in claim 1, wherein the vanadium ions of said step (a) have a concentration of 90% or greater of the vanadium $V^{4+}$.

3. The method as recited in claim 1, wherein the vanadium ions of said step (a) have a concentration of 95% or greater of vanadium $V^{4+}$.

4. The method as recited in claim 1, wherein the vanadium-based electrolyte solution includes sulfuric acid.

5. The method as recited in claim 1, wherein the concentration of the vanadium $V^{2+}$ of said step (d) in the vanadium-based electrolyte solution at the first electrode is equal to the concentration of the vanadium $V^{5+}$ of said step (d) in the vanadium-based electrolyte solution at the second electrode within +/−5%.

6. The method as recited in claim 1, further comprising preparing the vanadium-based electrolyte solution having vanadium ions of predominantly vanadium $V^{4+}$ of said step (a) by:
   (i) providing a first solution and a second solution, at least one of the first solution and the second solution including vanadium $V^{5+}$, at least one of the first solution and the second solution including a reducing agent, and a ratio of moles of the reducing agent to moles of vanadium $V^{5+}$ is 2:1 or greater; and
   (ii) combining the first solution and the second solution, the reducing agent reducing the vanadium $V^{5+}$ to the vanadium $V^{4+}$.

7. The method as recited in claim 1, wherein the reducing agent includes at least one of oxalic acid, formic acid, and alcohol.

8. The method as recited in claim 1, further comprising, after said step (d), discharging the flow battery by drawing electrical energy through the electric circuit from the first electrode and the second electrode to convert the vanadium $V^{2+}$ to $V^{3+}$ and to convert the vanadium $V^{5+}$ to $V^{4+}$.

9. The method as recited in claim 1, further comprising, after said step (d), repeatedly discharging and charging the flow battery by, respectively, drawing electrical energy through the electric circuit from the first electrode and the second electrode to convert the vanadium $V^{2+}$ to $V^{3+}$ and to convert the vanadium $V^{5+}$ to $V^{4+}$ and providing electrical energy through the electric circuit to the first electrode and the second electrode to convert the vanadium $V^{3+}$ to $V^{2+}$ and convert the vanadium $V^{4+}$ to $V^{5+}$.

* * * * *